(12) United States Patent
Llamas Sandin

(10) Patent No.: US 11,192,639 B2
(45) Date of Patent: Dec. 7, 2021

(54) AERODYNAMICS IMPROVEMENT DEVICE FOR AN AIRCRAFT AND AIRCRAFT EQUIPPED WITH SUCH DEVICE

(71) Applicant: AIRBUS OPERATIONS S.L., Madrid (ES)

(72) Inventor: Raul Carlos Llamas Sandin, Getafe (ES)

(73) Assignee: Airbus Operations S.L., Madrid (ES)

( * ) Notice: Subject to any disclaimer, the term of this patent is extended or adjusted under 35 U.S.C. 154(b) by 92 days.

(21) Appl. No.: 16/869,798

(22) Filed: May 8, 2020

(65) Prior Publication Data

US 2020/0361597 A1    Nov. 19, 2020

(30) Foreign Application Priority Data

May 14, 2019   (EP) .................................... 19382380

(51) Int. Cl.
 B64D 15/12  (2006.01)
 B64D 15/22  (2006.01)
 B64C 23/00  (2006.01)

(52) U.S. Cl.
 CPC ............ B64C 23/005 (2013.01); B64D 15/12 (2013.01); B64D 15/22 (2013.01)

(58) Field of Classification Search
 CPC ...... B64D 15/00; B64D 45/02; B64C 23/005; B64C 2230/12
 See application file for complete search history.

(56) References Cited

U.S. PATENT DOCUMENTS

| | | | |
|---|---|---|---|
| 5,621,332 A | 4/1997 | Inkpen et al. | |
| 6,402,093 B1* | 6/2002 | Wang | B64D 15/00 244/134 A |
| 6,570,333 B1 | 5/2003 | Miller et al. | |
| 8,251,318 B2* | 8/2012 | Khozikov | B64C 21/10 244/205 |

(Continued)

FOREIGN PATENT DOCUMENTS

| | | |
|---|---|---|
| CN | 104890881 | 9/2015 |
| CN | 109334998 A * | 2/2019 |

(Continued)

OTHER PUBLICATIONS

Extended Search Report for EP19382380.4, dated Sep. 16, 2019, 13 pages.

(Continued)

*Primary Examiner* — Brian M O'Hara
*Assistant Examiner* — Michael B. Kreiner
(74) *Attorney, Agent, or Firm* — Nixon & Vanderhye P.C.

(57) ABSTRACT

An aircraft (5) including an aerodynamic surface (6), an aerodynamics improvement device with a first electrode (27) embedded beneath and electrically isolated from the aerodynamic surface (6), a second electrode (28) electrically isolated from the first electrode (27), a voltage generator (30) adapted to apply a voltage between the first and the second electrode, further comprising a layer of electrically insulating material (26) between the second electrode (28) and the aerodynamic surface (6). Methods for detecting ice on and de-icing an aerodynamic surface (6), and for delaying a boundary layer transition and separation from the aerodynamic surface.

20 Claims, 5 Drawing Sheets

(56) References Cited

U.S. PATENT DOCUMENTS

| | | | | |
|---|---|---|---|---|
| 8,727,286 | B2* | 5/2014 | Silkey | F15D 1/12 |
| | | | | 244/205 |
| 9,462,700 | B2* | 10/2016 | Frankenberger | B64D 43/00 |
| 2008/0023589 | A1* | 1/2008 | Miles | H05H 1/2406 |
| | | | | 244/205 |
| 2009/0173837 | A1 | 7/2009 | Silkey et al. | |
| 2014/0319278 | A1* | 10/2014 | Ribarov | B64D 15/14 |
| | | | | 244/134 D |
| 2015/0298791 | A1* | 10/2015 | Nordin | B64D 15/12 |
| | | | | 244/45 R |
| 2016/0003147 | A1 | 1/2016 | Merlo et al. | |
| 2017/0088255 | A1* | 3/2017 | Nikic | B64C 23/005 |
| 2019/0112054 | A1* | 4/2019 | Zhao | B64D 15/12 |
| 2019/0193862 | A1* | 6/2019 | Kinlen | H05B 3/141 |
| 2019/0193863 | A1* | 6/2019 | Abdollahzadehsangroudi | |
| | | | | B64C 23/04 |

FOREIGN PATENT DOCUMENTS

| | | | |
|---|---|---|---|
| EP | 2 922 753 | 9/2015 | |
| EP | 3 147 207 | 3/2017 | |
| WO | 2014/081380 | 5/2014 | |
| WO | WO-2015024601 A * | 2/2015 | B64C 21/00 |
| WO | 2018/060830 | 4/2018 | |

OTHER PUBLICATIONS

Swept-wing transition control using DBD plasma actuators, 2018 Flow Control Conference, AIAA Aviation Forum, Jun. 25-29, 2018, Atlanta, Georgia, (in FTF).

* cited by examiner

AERODYNAMICS IMPROVEMENT DEVICE FOR AN AIRCRAFT AND AIRCRAFT EQUIPPED WITH SUCH DEVICE

RELATED APPLICATION

This application claims priority to European Patent Application 19382380-4 filed May 14, 2019, the entirety of which is incorporated by Reference.

TECHNICAL FIELD

The invention relates to an aerodynamics improvement device and an aircraft equipped with at least one such device. The aerodynamics improvement device particularly intends to improve the aerodynamics of an aircraft by avoiding the formation of ice, detecting the formation of ice, removing accreted ice, and delaying the separation of a boundary layer. The invention further relates to methods for detecting ice, avoiding and removing ice, and delaying the separation of a boundary layer from an aerodynamic surface of an aircraft.

In particular the invention relates to an anti-icing device for limiting or preventing the accretion of ice on an aircraft. The invention also relates to a device adapted to delaying the separation of a boundary layer from an aerodynamic surface of an aircraft.

BACKGROUND

Aircraft external surfaces are faced with the formation of ice when flying in certain atmospheric conditions. The temperatures in the atmosphere in these conditions are such that the air contains droplets of water in supercooled state. The supercooled droplets may form ice on an aircraft, in particular on forward facing aerodynamic surfaces of an aircraft such as wing and tail leading edges, nose, engines inlets, etc. It is well known that the formation of ice is detrimental to the efficiency and functionality of the aircraft, particularly to its lifting and control surfaces. For example, the mobility of movable parts may be reduced by the formation of ice; the total weight and drag of the aircraft may significantly increase; and aerodynamic efficiency of aerodynamic surfaces, in particular aerodynamic lift, may decrease because the flow of air around the aircraft and in particular around the aircraft's aerodynamic surfaces are perturbed by ice accretion.

It is therefore essential that a pilot or a computer on-board be aware of the formation, or possibility of formation, of ice, and therefore of the modification of the aircraft aerodynamics, as well as to permit a pilot or a computer to take counter-action against this ice accretion, such as activating a de-icing system.

In general terms it is beneficial to prevent the formation of ice on aircraft parts.

Additionally, the separation of a boundary layer on a lift surface or a control surface, which usually happens at high angles of attack, is detrimental to the aerodynamic behavior, to the efficiency of the aircraft, and to the control of the aircraft. Delaying the separation of the boundary layer improves the maneuverability of the aircraft and its efficiency at high angle of attacks.

Many systems have been implemented in aircrafts over the years to limit or avoid the formation of ice, and to de-ice iced surfaces of an aircraft.

The most common systems warm up certain portions of the aircraft which are more prone to icing, or which icing will impact most the functioning, safety or efficiency of the aircraft. In particular, in most systems, warm air is bled from the engines and circulated behind an aerodynamic skin such as a wing leading edge for example. Other warming systems comprise electrical resistances, electrical coils, etc.

Some other solutions against the formation of ice also include the use of chemicals, either applied externally to the aircraft or encapsulated in and progressively released from the surface of the aircraft.

Mechanical solutions have also been developed, such as inflatable surfaces, to remove ice.

Both for de-icing aerodynamic surfaces and for delaying the separation of boundary layers from aerodynamics surfaces, solutions have been proposed which require the local formation of a plasma in air. The plasma is obtained by ionizing the air between two electrodes with a high voltage difference.

CN104890881 discloses a plasma actuator for de-icing an aircraft surface prone to icing, comprising an upper electrode and a lower electrode in a polyimide insulating layer, the upper electrode being connected to a positive voltage source, and the lower electrode being connected to a negative voltage source. In this plasma actuator the electrodes are attached to a skin of an aircraft with glue on the insulating layer. The upper electrode is exposed to air and therefore is susceptible to erosion and other damage due to exposure.

US 2016/0003147 discloses a system for preventing icing on an aircraft surface operationally exposed to air. It describes an engine nacelle including a system for preventing icing comprising a dielectric barrier discharge type plasma actuator applied on an exposed surface. It comprises an electrode exposed to air, an intermediate portion of dielectric material, and a covered electrode, as well as a high-voltage electric power generator connected between the electrodes. The device proposed also comprises an exposed electrode.

WO2018/060830 describes a system for ice detection and prevention in which the electrodes are printed onto an external surface. In such devices, the electrodes are also exposed to the outer atmosphere.

In "Swept-wing transition control using DBD plasma actuators", 2018 Flow Control Conference, AIAA AVIATION Forum, Jun. 25-29, 2018, Atlanta, Ga., an array of plasma actuators placed on a leading edge for delaying the separation of a boundary layer is described. This array delays the boundary layer transition from laminar to turbulent. A plasma actuation at high frequencies is described to generate spanwise-modulated plasma jets. The plasma is generated by electrodes printed directly on the surface of the leading edge. The electrodes are exposed to air.

SUMMARY OF INVENTION

The invention aims to provide an aircraft with a reliable ice detection device.

The invention aims to provide an aircraft with efficient and economic ice detection, anti-icing and de-icing functions.

The invention aims to provide an aircraft with improved lift at high angle of attacks.

The invention also proposes an aircraft with reduced drag.

The invention aims to provide an aircraft particularly resistant to erosion, such as air or sand erosion.

The invention also aims to provide an aircraft with an optimized weight.

The invention proposes an aircraft comprising: an aerodynamic surface adapted to be exposed to a flow of air, and at least one aerodynamics improvement device comprising: at least a first electrode embedded beneath the aerodynamic surface and separated from the aerodynamic surface by at least one layer of an electrically insulating material; at least a second electrode, electrically isolated from the first electrode; a voltage generator, connected to the first electrode and to the second electrode and adapted to apply a voltage signal between the first electrode and the second electrode; and at least one layer of an electrically insulating material between the second electrode and the aerodynamic surface.

More generally the invention also extends to an aerodynamics improvement device comprising: at least a first electrode embedded in an electrically insulating material, at least a second electrode, electrically isolated from the first electrode, and a voltage generator, connected to the first electrode and to the second electrode, and adapted to apply a voltage signal between the first and the second electrode, characterized in that the second electrode is embedded in an electrically insulating material.

In the whole text of this application, the term 'electrode' is used indifferently for the first electrode or the second electrode. In particular the first electrode may be an anode and the second electrode cathode or the first electrode a cathode and the second electrode an anode.

A voltage signal is an electrical potential difference, which may or may not vary in value over time. A voltage signal may for example take different values, shapes, frequencies. The term 'voltage' is used for the value taken by the voltage signal. An aerodynamic surface of an aircraft may be any external surface of the aircraft. It may in particular comprise lift or control surfaces such as wings, horizontal and vertical tail planes, slats, flaps, ailerons, elevators, rudders, spoilers, tabs, or also engines inlet cowls or Pitot tubes. More particularly an aerodynamic surface may be a leading edge or an extrados, e.g., upper surface of the aerodynamic surface.

The invention allows to implement a plasma-based aerodynamic enhancement of an aircraft aerodynamic surface, while maximizing the erosion resistance of said aerodynamic surface. Indeed, according to the invention an aircraft component may comprise an external layer forming the aerodynamic surface made with only one material. The external layer may be homogeneously made of a same material. This allows to choose a material particularly resistant to erosion, in particular to air, water and sand erosion.

The external surface of the wing may thus be smooth and continuous. The absence of material difference between two portions of an external layer forming the aerodynamic surface of the aircraft limits the heterogeneous erosion and deterioration of the aerodynamic surface. The absence of material difference between two portions of an external layer forming the aerodynamic surface of the aircraft also exclude any risk of galvanic corrosion at the interface between two materials exposed to ambient atmosphere.

The first electrode and the second electrode are thus both embedded beneath the aerodynamic surface and separated from it by one or more layer(s) of electrically insulating material. The electrically insulating material may be a solid material. The first electrode and/or the second electrode may be isolated from the aerodynamic surface by a plurality of layers. Each layer may be of the same or different materials.

The first electrode and the second electrode may be insulated from the aerodynamic surface over their entire outer surfaces. The first electrode and the second electrode may not comprise any portion exposed to air. The electrodes are thus not exposed to atmospheric conditions. Their properties, in particular their electrical properties, thus remain stable over time. The electrodes are protected from the external environment, in particular from the atmosphere, such that they are not exposed to water, chemicals or erosion. A device according to the invention is thus particularly durable.

The first electrode and/or the second electrode may be placed a leading edge of a wing or of a horizontal tail plane, a vertical tail plane. or other lift or control surface of an aircraft. The first and second electrodes function to detect icing, perform anti-icing functions and de-icing functions.

The first electrode and/or the second electrode may also be placed on a fore portion of an extrados, e.g., aerodynamic upper surface, of lift or control surfaces, e.g., leading edges, of an aircraft, in particular for ensuring functions such as delaying stall at high angle of attack and improving laminarity of a flow over an aerodynamic surface of the lift or control surface.

The first electrode and/or the second electrode may also be placed on a fore portion of an of intrados interior surface, of lift or control devices, e.g., leading edges, of an aircraft, in particular for ensuring functions improving laminarity of a flow over an aerodynamic surface of the lift or control surface.

The voltage generator may be adapted to apply a voltage signal between the first electrode and the second electrode of at least a predetermined voltage, called ionizing voltage, adapted to ionize air above the aerodynamic surface. In some embodiments of the invention, the voltage generator comprises a voltage amplifier.

The voltage generator may be adapted to apply a voltage signal which permanently or intermittently have a voltage value equal to or higher than said ionizing voltage.

The ionizing voltage may be defined as the minimum voltage to apply between (across) the first electrode and the second electrode to ionize air above the aerodynamic surface.

The ionizing voltage may for example be about 5 kV. The voltage applied by the voltage generator may for example be of at least 10 kV.

Upon application of a voltage of at least the ionizing voltage, air is ionized on a path between the first electrode and the second electrode above the aerodynamic surface, in the vicinity of the first electrode and the second electrode. The ionized air locally forms a plasma.

The formation of a plasma heats up the air, thereby locally reducing the icing of the aerodynamic surface.

Moreover, at formation of the plasma, an ultrasonic discharge happens locally in the air, which has proved to avoid the formation of ice on the aerodynamic surface. Such ultrasonic discharge may also contribute to the de-icing of the aerodynamic surface.

Finally, the ionized air or plasma circulates locally from an electrode towards the other, such that it may locally create a flow of air or plasma stream. This stream may accelerate, decelerate or deviate an overall flow of air along the aerodynamic surface, and thus perturbate very locally the overall flow of air along the aerodynamic surface. Such local perturbation of the flow of air along the aerodynamic surface may create flow perturbations, which allow the boundary layer to remain closer to the aerodynamic surface for a longer distance, thereby improving the flow of air along the aerodynamic surface and the efficiency of the aerodynamic surface. The invention thus allows a wing to stall at a high angle of attack, higher than without activation of the aerodynamics improvement device.

In an aerodynamics improvement device according to the invention: a distance between the first electrode and the second electrode, and a minimum distance between (across) the first electrode and the aerodynamic surface, and a minimum distance between (across) the second electrode and the aerodynamic surface, may be adapted to ionize air proximate to the aerodynamic surface upon application of a voltage of at least the ionizing voltage between the first electrode and the second electrode.

The minimum distance between the aerodynamic surface and an electrode may be defined as the minimum distance from a point on the aerodynamic surface and the electrode. The minimum distance may be defined as the length of a segment perpendicular to the aerodynamic surface and joining a surface of the electrode.

The distance between the aerodynamic surface and the electrode is the thickness of the one or more layers between the electrode and the aerodynamic surface.

The first electrode and the second electrode may be embedded in an electrically insulating material.

The electrically insulating material may for example be a polyurethane. A polyurethane layer may insulate the first electrode and the second electrode from an exterior of an aircraft.

In some embodiments of the invention, the external surface of a component of an aircraft may comprise a polyurethane. This external surface may however be coated with paint or other surface protections. Polyurethanes provide a good resistance to air and sand erosion.

In alternative embodiments, an anti-erosion coating may be applied directly over the electrically insulating material embedding the electrodes.

A polyurethane between an electrode and the aerodynamic surface, may thus ensure both the function of insulating the electrode from an exterior of the aircraft and the function of providing a material resistant to erosion for forming the external surface of an aircraft component.

The electrically insulating material in which the first electrode and the second electrode are embedded may be adapted to: electrically isolate the first electrode and the second electrode from direct electrical discharges upon application of the ionizing voltage, and enable an air ionization above the aerodynamic surface upon application of the ionizing voltage between the first electrode and the second electrode.

An aircraft may embody the invention and include: an ice detection device adapted to: apply a predetermined voltage signal, called permittivity voltage, between a first electrode and a second electrode, measure an electrical current, called permittivity current, between said first electrode and said second electrode, compute a permittivity value representative of an electrical permittivity between said first electrode and said second electrode, based on the permittivity current upon application of the permittivity voltage between said first electrode and said second electrode.

The permittivity value may be computed based on the permittivity voltage applied and the permittivity current measured. The permittivity value may be at least partially based on a result of a phase shift between a permittivity voltage applied and a permittivity current measured.

The ice detection device may for example compare a value of the permittivity current to a stored permittivity value.

The stored permittivity value may be a fixed value, which may be a value obtained experimentally for a specific component of an aircraft with a specific arrangement of electrodes, voltage, materials, etc., and stored in a memory at manufacturing.

The stored permittivity value may alternatively be a value previously measured in flight and stored as a reference. The ice detection device may be able to track the evolution of the permittivity proximate the external surface by storing one or more previous value(s) of the permittivity.

The ice detection device may be adapted to detect a permittivity variation. The ice detection device may be adapted to detect a permittivity variation in a region proximate the external surface of the aircraft. The ice detection device may be adapted to detect a permittivity variation representative of the formation of ice on the external surface.

The ice detection device may be adapted to output a permittivity signal comprising data representative of an electrical permittivity value.

The permittivity signal may comprise data representative of the computed permittivity value. It may also comprise data representative of the presence of ice. For example the ice detection device may only output a signal such as a voltage, if the computed permittivity value is representative of the presence of ice on the external surface of the aircraft.

The signal or other indication of the presence of ice may be sent, directly or indirectly, to a display for a pilot, and/or to a computing unit controlling a de-icing device.

Upon detection of the formation of ice, a de-icing device may be activated. More particularly, upon detection of ice, the voltage generator may be activated to power the first electrode and the second electrode with a voltage of at least the ionizing voltage, in order to limit the accretion of ice on the aerodynamic surface and de-ice the aerodynamic surface.

The first electrode and the second electrode to which the ice detection device applies a permittivity voltage may be the same electrodes as the first electrode and the second electrode to which the aerodynamics improvement device applies a ionizing voltage. Thereby an aircraft according to the invention may comprise an aerodynamics improvement device and an ice detection device with a minimal total weight. Indeed the electrodes are thereby used for multiple function and the aircraft does not need additional electrodes for additional functions.

In an ice detection device and method for detecting ice according to the invention, ice may be detected in a very accurate manner while adding a minimal weight to the aircraft.

An aircraft according to the invention may comprise a controller adapted to control the voltage generator.

An aircraft according to the invention may comprise a controller adapted to control the voltage generator and the ice detection device.

The aerodynamics improvement device may comprise at least one controller adapted to control the voltage generator and the ice detection device.

The controller is in particular adapted to alternate the functions of the ice detection device and of the voltage generator.

The ice detection device is adapted to detect ice by applying a low voltage signal, while the voltage generator applies a high voltage signal for anti-ice, de-icing and non-separation of the boundary layer functions. Therefore, both devices cannot simultaneously be connected to the electrodes. The controller therefore disconnects and/or shuts the voltage generator while it activates and/or connects the ice detection device, and vice-versa.

The ice detection device may comprise an isolator adapted to disconnect the sensor(s) of the ice detection device from the electrodes. The isolator may be controlled by the controller.

The controller may be adapted to activate the voltage generator for supplying the electrodes with a voltage signal having at least some voltage values of at least the ionizing voltage, upon reception of a permittivity signal from the ice detection device, said permittivity signal being indicative of the accretion of ice on the aerodynamic surface.

The function ensured by the controller may be ensured by any other equivalent device such as a central computer for example.

At least one of the first electrode and the second electrode may be part of a lightning strike protection device.

Aircraft comprising non-metallic parts must comprise a strike protection device for conducting the electrical charges received by the aircraft in case of lightning strike. In particular aircraft must comprise an electrically conductive protection at the prominent extremities of the aircraft such as wing tips, or horizontal and vertical planes. The electrically conductive protection may for example be a metallic mesh. Such electrically conductive protection may be integrated in the skin of the aircraft.

The first electrode and/or second electrode of the invention may be electrically connected to an electrically conductive protection. An electrode of the invention may also be connected to the ground plane of the aircraft. An electrode of the invention may thus conduct electrical charges between any electrically conductive protection of the aircraft and the ground plane of the aircraft, thereby contributing to the homogenization of electrical charges on the aircraft and being part of the lightning strike protection of the aircraft. The electrodes of the invention may thus ensure more than one function.

For example a voltage may be applied to the second electrode only for anti-ice, de-icing, detecting ice, delaying boundary layer, while the first electrode is connected to the lightning strike protection. The application of a voltage to the second electrode thus creates a voltage difference between the first electrode and the second electrode for the generation of plasma discharges.

The invention allows to minimize the weight impact on the aircraft's overall weight by connecting one or more electrode of the invention to the lighting strike protection device.

The electrodes of the invention may thus ensure two or more functions simultaneously or alternatively.

The aerodynamic surface may be formed by an external surface of a horizontal tail plane.

The aerodynamic surface may be formed by an external surface of a wing.

The aerodynamics improvement device may comprise: a first group of electrodes embedded beneath the aerodynamic surface, adapted and arranged to limit the accretion of ice on the aerodynamic surface upon application of the ionizing voltage between the first electrode and the second electrode, and a second group of electrodes embedded beneath the aerodynamic surface, adapted and arranged to create local perturbations in a flow of air along the aerodynamic surface upon application of the ionizing voltage between the first electrode and the second electrode.

In particular, the second group of electrodes is adapted and arranged to create local perturbations in a boundary layer of a flow of air along the aerodynamic surface.

Each group of electrodes comprises at least one first electrode and at least one second electrode.

Moreover, the aerodynamics improvement device may be adapted to apply a first voltage signal, called de-icing voltage, to the first group of electrodes, and a second voltage signal, called anti-stall voltage, different from said de-icing voltage, to the second group of electrodes. In particular the controller and the voltage generator may be adapted to apply a de-icing voltage to the first group of electrodes and an anti-stall voltage to the second group of electrodes.

The de-icing voltage and the anti-stall voltage are ionizing voltages adapted to generate an air plasma above the aerodynamic surface between a first electrode and second electrode to which they are applied. The de-icing voltage and the anti-stall voltage may be voltage signals with predetermined frequency, pattern and values. They may be adapted during a flight of the aircraft in function of one or more parameters. Such parameters may be the presence or absence of ice, the external temperature, the speed of the aircraft, the angle of attack of the aircraft, etc.

The first group of electrodes may be embedded beneath the aerodynamic surface in an area of the aerodynamic surface susceptible to accrete ice. The first group of electrodes may in particular be embedded in a leading edge of a wing, of a horizontal tail plane or of a vertical tail plane.

The first group of electrodes may comprise a plurality of said first electrode and a plurality of said second electrode.

The second group of electrodes may be embedded beneath the aerodynamic surface in an area fore to an area of the aerodynamic surface susceptible to a separation of a boundary layer. The second group of electrodes may be embedded beneath an area where it has been determined that creating perturbations in a flow of air along the aerodynamic surface would result in an improved attachment of the boundary layer to the aerodynamic surface, in particular at high angles of attack.

The second group of electrodes may in particular be embedded in a fore portion of an extrados, upper surface, of a wing, or of a horizontal tail plane.

The second group of electrodes may comprise a plurality of said first electrode and a plurality of said second electrode.

A group of electrodes may comprise more than two electrodes. In particular it may comprise three or more electrodes, in which at least one electrodes acts as a first electrode to a second electrode and as a second electrode to a third electrode. In such device the voltage generator may be adapted to output at least three voltages, with a voltage gap between two successive voltage values of at least an ionizing voltage.

The voltage generator may also be adapted to deliver a first voltage to a first electrode and at least a third electrode, and a second voltage to at least a second electrode, said second electrode being placed between the first electrode and the third electrode. The difference between the first voltage and the second voltage may be of at least an ionizing voltage.

The aerodynamics improvement device may comprise a plurality of electrode couples comprising at least one first electrode and one second electrode each. The arrangement of a first electrode couple may differ from the arrangement of a second electrode couple.

The distance between the first electrode and the second electrode may be different in two different electrode couples.

The shape of the first electrode and/or the second electrode may be different in two different electrode couples.

At high angle of attacks of the aircraft, the aerodynamics improvement device may be adapted to apply an anti-stall voltage to the first group of electrodes. Indeed, a first group of electrodes being placed on leading edge at low angles of attack is functionally on the extrados at higher angles of attack. Its function may thus be of anti-icing or de-icing at low angles of attack and of delaying separation of the boundary layer at higher angles of attack.

An aerodynamics improvement device according to the invention may also comprise a third group of electrodes. The third group of electrodes may have the function of creating flow perturbations with a specific spatial pattern such that the flow instabilities that grow in a laminar boundary layer are dampened and therefore the transition from laminar to turbulent regime in said boundary layer is spatially delayed along the aerodynamic surface, bringing a corresponding reduction of friction drag in the aerodynamic surface. The third group of electrodes may be placed aft to the second group of electrodes.

The shape and arrangement of at least one of the first electrode and second electrode may be adapted to generate plasma discharges with a predetermined spatial arrangement. The arrangement of the electrodes may be adapted to control the boundary layer evolution, and in particular the separation point of the boundary layer from the aerodynamic surface. The spatial arrangement of the plasma discharges may be adapted according to characteristics of the aircraft such as its cruise speed, the shape of its wings, etc.

The first electrode and/or the second electrode may have an elongated shape. The electrodes may be elongated along a wingspan of a wing, of a horizontal tail plane or of a vertical tail plane. They may in particular be band-shaped, with a small thickness compared to their width, and a small width compared to their length.

The first electrode and second electrode may be arranged parallel to each other.

At least one of the second electrode may comprise at least one tip towards the first electrode. The tip may have different possible shapes such as a finger, a triangle, a rectangle, etc.

The second electrode may have a comb shape.

The tips of the second electrode may be the most proximate points of the second electrode to the first electrode. The geometry of the second electrode may thus allow to control the exact location of formation of air plasma. In particular, a second electrode having one or more tips toward the first electrode will allow the local formation of air plasma between the first electrode and the tip(s) of the second electrode.

The distance between two successive tips may be non-uniform along an electrode, and thus along a wingspan. The functions of the electrodes may thus be adapted to the portion of the aerodynamic surface of the aircraft in which they are situated. For example a portion of a wing may accumulate more or less ice at its base or at its end, or the ice accretion in one portion of the wing may have more or less impact on the aerodynamics of the aircraft.

In some embodiments, both the first electrode and the second electrode may each comprise at least one tip. The shape of the first electrode and the second electrode may influence the location of the plasma generation. With first electrode and the second electrode arranged so as to comprise portions in which they are more proximate to each other than in other portions, the location of the air plasma generated upon application of an ionizing voltage can be predetermined. In particular, first electrode and/or the second electrode comprising tips oriented toward each other allow to predetermine specific points or paths at which an air plasma will be generated.

The first electrode may have a comb shape.

The tip(s) of the first electrode and the second electrode may be oriented toward each other.

The tips of the first electrode and the second electrode may alternatively be oriented in the same direction facing away from the other electrode.

The first electrode and the second electrode may also comprise tips oriented towards each other and other tips facing away from the other electrode, and/or they may comprise tips facing each other and other tips shifted along the wingspan of the aerodynamic surface.

Tips of the first electrode and the second electrode may face each other. Aligned tips allow the plasma to flow in the same direction as the direction of the air flow when the aircraft is flying. Such arrangement allows to excite the laminar boundary layer in such a way as to dampen the so called "cross-flow" instabilities which are responsible for the transition from a laminar boundary layer to a turbulent boundary layer, thereby allowing to reduce friction drag. Tips of the first electrode and the second electrode may be shifted, for example shifted along a wingspan of a lift or control surface. For example a comb-like shaped first electrode and a comb-like shaped second electrode may be imbricated with tips towards each other. The tips of the second electrode may thus be separated from the tips of the first electrode by a distance along the wingspan so as to generate plasma streams along the wingspan. Shifted tips allow the plasma to flow in a direction having a non-null component orthogonal to the direction of air flow along the aerodynamic surface when the aircraft is flying. Such arrangement allows to delay the boundary layer transition and separation along the aerodynamic surface by creating specific local perturbations in the air flow.

In particular the arrangement of tips of a first electrode and/or a second electrode may differ from a first electrode couple to a second electrode couple. The distance between two successive tips of a first electrode and/or second electrode may differ between a first electrode couple and a second electrode couple.

The invention may be embodied as a method for detecting the presence of ice on an aerodynamic surface of an aircraft comprising: applying a predetermined voltage signal, called permittivity voltage, between two electrodes electrically isolated from each other, arranged beneath the aerodynamic surface, measuring a response in current between the two electrodes, detecting a change in electrical permittivity between the two electrodes.

In such method one or more of the electrodes may not be electrically isolated from the aerodynamic surface. At least one of the electrodes may be at least partially exposed to air surrounding the aerodynamic surface.

In particular embodiments of the invention, in a method for detecting the presence of ice on an aerodynamic surface of an aircraft, the electrodes are electrically isolated from the aerodynamic surface.

In particular, this method comprises detecting a change in electrical permittivity between the two electrodes with respect to a permittivity value of reference.

In a method according to the invention, at least one of the two electrodes may also form at least part of the aerodynamic surface. In such embodiments, the electrode is thus at least partially exposed to air surrounding the aerodynamic surface.

The permittivity voltage is chosen to allow the measurement of an electrical permittivity between the two electrodes. More particularly the permittivity voltage is chosen to allow the measurement of a permittivity on a path between the two electrodes, outside the aerodynamic surface. The permittivity voltage may for example be of about 128V, well below the ionizing voltage, such that no plasma appears in the air.

The measuring may be intermittent. The electrodes may then be used for anti-ice or de-icing functions at higher voltage during periods when there is no measurement being carried out.

The detection of a change in permittivity may for example be carried out by comparing a measured or calculated value to a preceding value or set of values. It may also be carried out by comparing a measured value to a stored threshold value representative of the presence of ice. The stored threshold value may for example have been obtained experimentally for a specific component of an aircraft with a specific arrangement of electrodes, voltage, materials, etc.

The value used for detecting a change in permittivity may be a value of a current intensity measurement circulating in the electrodes when the permittivity voltage is applied. It may, alternatively or in combination, be a value obtained by a measurement of a phase difference between the permittivity voltage applied and the permittivity current measured. It may be any other alternative value from a measurement and/or a calculation at least partially based on a measurement.

In a method for detecting the presence of ice according to the invention, the permittivity voltage may be applied intermittently between the electrodes.

In a method for detecting the presence of ice according to the invention, the permittivity voltage may be applied intermittently between the electrodes and may further comprise, between two successive applications of the permittivity voltage to the electrodes, a step of applying a voltage signal of at least a predetermined voltage, called ionizing voltage, adapted to ionize air above the aerodynamic surface.

The ionizing voltage has a much higher value than the value of the permittivity voltage. Therefore, an ice detection device must be disconnected from the electrodes when the ionizing voltage or a higher voltage is applied to the electrodes in order to protect the ice detection device. A method according to the invention therefore alternates between the application of a permittivity voltage simultaneously with the activation of an ice detection device allowing the measurement of a permittivity of an environment directly above the aerodynamic surface and thus permitting the detection of ice accretion on the aerodynamic surface, and the application of a ionizing voltage permitting to avoid or limit the accretion of ice on the aerodynamic surface, as well as de-ice the aerodynamic surface.

The invention may be embodied as a method for limiting the formation of ice and de-icing an aerodynamic surface of an aircraft comprising applying a voltage signal of at least a predetermined voltage, called ionizing voltage, between two electrodes electrically isolated from each other, arranged beneath the aerodynamic surface, and electrically isolated from the aerodynamic surface, said ionizing voltage being adapted to ionize air above the aerodynamic surface.

In particular, the method includes applying a voltage signal with at least a value of at least the ionizing voltage.

The method particularly encompasses applying a voltage signal between a first electrode and a second electrode, the second electrode being electrically isolated from the first electrode, the first electrode and the second electrode being arranged beneath the aerodynamic surface, each electrode being electrically isolated from the aerodynamic surface.

Each electrode is electrically isolated from air surrounding the aerodynamic surface by at least one layer of an electrically insulating material. Said electrically insulating material is a solid material. The electrically insulating material may for example be a synthetic material such a polymer, for example a polyurethane.

The invention may be embodied as a method for delaying the separation of a boundary layer of an air flow on an aerodynamic surface of an aircraft comprising applying a voltage signal of at least a predetermined voltage, called ionizing voltage, between two electrodes electrically isolated from each other, arranged beneath the aerodynamic surface, and electrically isolated from the aerodynamic surface, said ionizing voltage being adapted to ionize air above the aerodynamic surface.

In particular, the method includes applying a voltage signal with at least a value of at least the ionizing voltage.

A method for delaying the separation of a boundary layer may also comprise applying a voltage of at least the ionizing voltage to at least one of the first electrode and second electrode at a predetermined frequency, called ionizing frequency.

The ionizing frequency is the frequency of the voltage signal applied by the voltage generator between the first electrode and the second electrode.

The ionizing frequency may depend on the speed of the aircraft.

The ionizing frequency may depend on the angle of attack of the aircraft. More particularly the ionizing frequency may depend on the angle of attack of a part of the aircraft such as for example a wing or a horizontal tail plane.

The control of a boundary layer of an air flow along an aerodynamic surface of the aircraft may thus be more precisely controlled. The separation of a boundary layer may thus be delayed in an adaptive and very effective manner, depending on the aerodynamic situation of the aircraft.

Similarly the control of the separation of a boundary layer may comprise the activation or deactivation of an aerodynamics improvement device according to the invention.

A method for delaying the separation of a boundary layer of an air flow on an aerodynamic surface of an aircraft according to the invention may in particular consist in applying a ionizing voltage between two electrodes such that an ion flow (or plasma stream) is created in a direction comprising at least a non-null component orthogonal to an aerodynamic flow of air along the aerodynamic surface. In particular the method is adapted to apply an ionizing voltage between two electrodes arranged so as to form a local flow of air ions in a direction orthogonal to a flow of air due to the displacement of the aerodynamic surface in the air.

The invention may also be embodied with other possible combinations of features described in the above description and in the following description relative to the figures. In particular, the invention extends to aircraft comprising features described in relation to the aerodynamics improvement device and/or the ice detection device, as well as in relations to methods for detecting ice and/or methods for de-icing an aerodynamic surface and/or methods for delaying the separation of a boundary layer; the invention extends to methods for detecting ice and/or for de-icing an aerodynamic surface and/or for delaying the separation of a boundary layer comprising features described in relation to an aircraft and/or a aerodynamics improvement device and/or an ice detection device according to the invention.

SUMMARY OF DRAWINGS

Some specific exemplary embodiments and aspects of the invention are described in the following description in reference to the accompanying figures.

DETAILED DESCRIPTION

Figure 1:
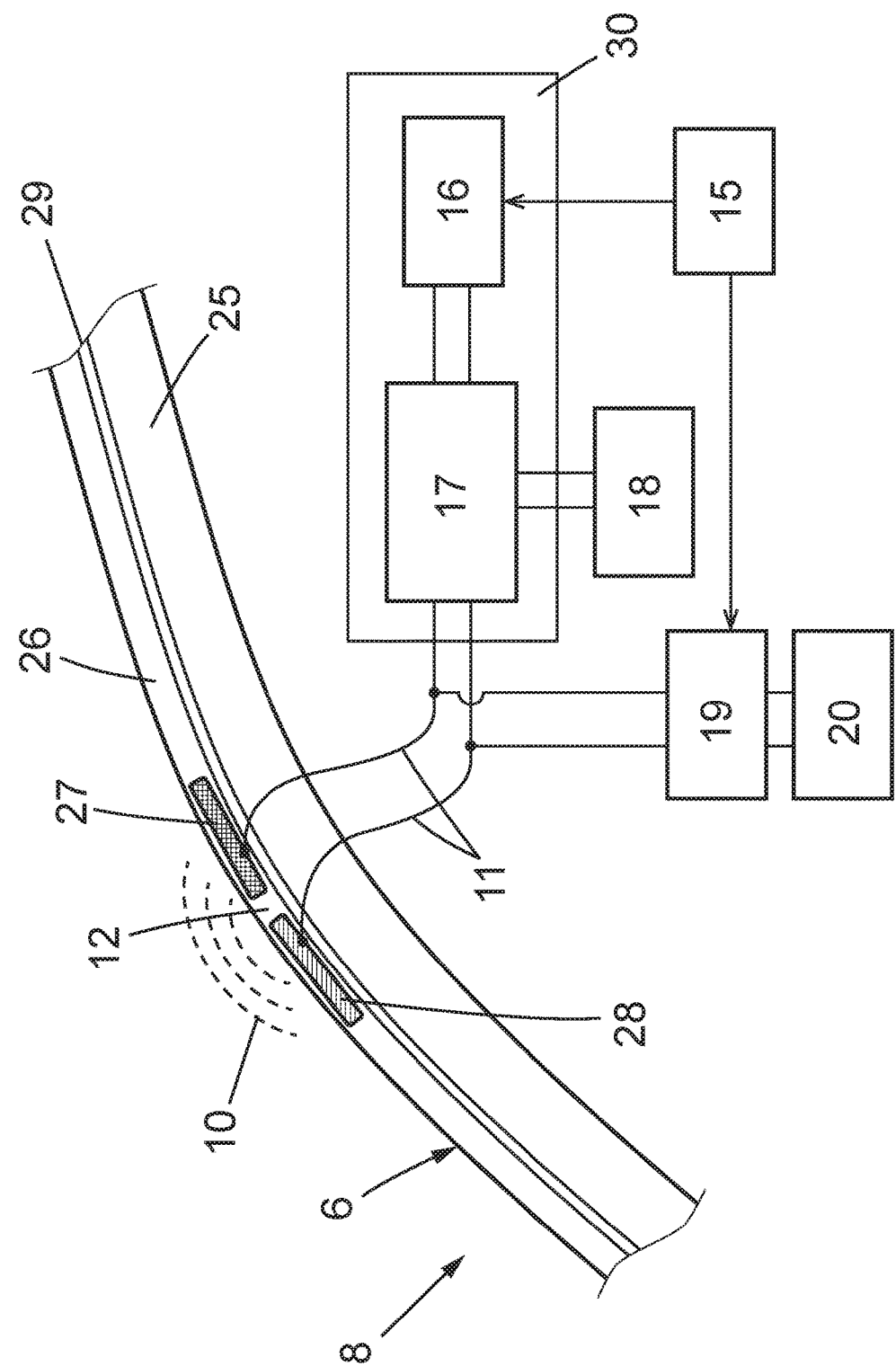
FIG. 1 is a schematic representation of a cross-section of a portion of a wing of an aircraft and electrical components housed within the wing.

In FIG. 1, a portion of a wing 8 is represented. It comprises a structural layer 25 supporting the loads of the wing. The structural layer 25 forms a part of the skin of the wing 8 and comprises an outer surface providing for an outer shape of the wing. It further comprises an electrically isolating layer 29 on the outer surface of the structural layer 25 with the function of preventing the electrical connection between the electrodes 27 and 28 through the structural layer 25. The structural layer may for example comprise carbon fiber-reinforced polymer.

It comprises an additional external anti-erosion and electrically insulating layer 26 over the electrically isolating layer 29. The anti-erosion layer 26 is adapted to be resistant to erosion, in particular to air, sand and water erosion, while remaining light.

The outer surface of the anti-erosion layer 26 forms the aerodynamic surface 6 of the wing 8.

The anti-erosion layer 26 is also electrically insulating. The material of the anti-erosion layer 26 is beneficially chosen from the electrically insulating materials. The anti-erosion layer 26 may be made in a polymer such as a polyurethane for example.

Additional layer(s) (not-represented) of paint or surface treatments may be added to the anti-erosion layer 26.

The aircraft of which a part is schematically represented on FIG. 1 comprises an aerodynamics improvement device according to the invention.

The aerodynamics improvement device comprises a first electrode 27 and a second electrode 28. Both the first electrode 27 and the second electrode 28 are embedded in the anti-erosion layer 26. The first electrode 27 and the second electrode 28 are thus separated and electrically insulated from the aerodynamic surface 6 by a portion of the anti-erosion layer 26. The first electrode 27 and a second electrode 28 are not exposed to the environment of the aircraft, and do not form part of the aerodynamic surface 6.

The first electrode 27 and the second electrode 28 are separated from each other by a gap 12 adapted to ensure a sufficient electrical insulation between the first electrode and the second electrode. Should the material chosen as anti-erosion layer 26 not be sufficiently electrically insulating or should the distance between the first electrode 27 and the second electrode 28 be reduced, a thin layer of highly-electrically insulating material may be inserted in the anti-erosion layer 26 between the first electrode 27 and the second electrode 28.

The aerodynamics improvement device also comprises a voltage generator 30. The voltage generator 30 comprises a function generator 16 and a voltage amplifier 17. The function generator 16 delivers a voltage signal. The voltage signal may be of any sort. In some embodiments the voltage signal may be a periodic signal. The frequency of the periodic signal may be constant or may be depending on other parameters.

The aerodynamics improvement device also comprises a controller 15. The controller 15 controls the function generator 16. The controller may activate or deactivate the function generator 16. The controller 15 may also provide instructions to the function generator 16. The controller 15 provides instructions for controlling the voltage signal output by the function generator 16. The function generator 16 is adapted to, upon reception of instructions from the controller, deliver a voltage signal of a predetermined type and/or amplitude and/or frequency.

The controller 15 may have further functions in the aircraft or may be specifically dedicated to an aerodynamics improvement device according to the invention.

The controller 15 may receive, as inputs, data representative of multiple parameters relative to the aircraft and/or its environment such as, for example: local electrical permittivity, outside air temperature, outside hygrometry, relative airspeed of the aircraft, angle of attack of the aircraft, etc.

The voltage signal delivered by the function generator 16 is amplified by the voltage amplifier 17, which is powered by a voltage source 18. The voltage amplifier 17 is connected to the first electrode 27 and second electrode 28 to create a voltage difference between the first electrode 27 and the second electrode 28. The voltage amplifier 17 is adapted to supply the first electrode 27 and the second electrode 28 via conductors, e.g., wires 11, with a voltage difference of at least an ionizing voltage, adapted to generating an air plasma current 10 above the aerodynamic surface 6. The air plasma is generated above the gap 12 between the first electrode 27 and the second electrode 28 and creates a local plasma stream. The voltage generator may be adapted to provide a voltage of at least 10 kV.

The aerodynamics improvement device also comprises an ice detection device 20 adapted to measure an electrical permittivity between the first electrode 27 and the second electrode 28. The first electrode 27 and the second electrode 28 being fixedly arranged in the anti-erosion layer 26, the permittivity variation between the first electrode 27 and the second electrode 28 is indicative of a variation of the permittivity of the external environment above the aerodynamic surface 6 due to a change in the local characteristics of the space between the electrodes above the aerodynamic surface, as can be expected when ice is accreted on the surface.

The ice detection device 20 is adapted to output a permittivity voltage adapted to measure a variation of permittivity in the environment directly above the aerodynamic surface 6. The ice detection device 20 is connected to the first electrode 27 and the second electrode 28 so as to be able to apply the permittivity voltage between the first electrode 27 and the second electrode 28. The ice detection device 20 may be configured to monitor the electrodes to detect a change of the permittivity voltage during flight of the aircraft. If the change in the permittivity voltage meets a predetermined value, the ice detection device 20 output a signal or data indicating the presence of ice on the aerodynamic surface associated with the first and second electrode, The signal or data indicating the presence of ice may by applied by the controller 15 to apply ionizing voltages to the first and second electrodes and/or generate an audio and/or visual alert to a pilot in a cockpit of the aircraft.

An isolator 19 is placed between the ice detection device 20 and the first electrode 27 and the second electrode 28 so as to disconnect the ice detection device 20 from the first electrode 27 and the second electrode 28. The controller 15 is adapted to control the isolator 19. The controller 15 is adapted to disconnect the isolator 19 when the voltage generator 30 is activated, and to connect the isolator 19 when the voltage generator 30 is deactivated. The ice detection device 20 is thus protected from high voltages delivered by the voltage generator 30.

Figure 2:
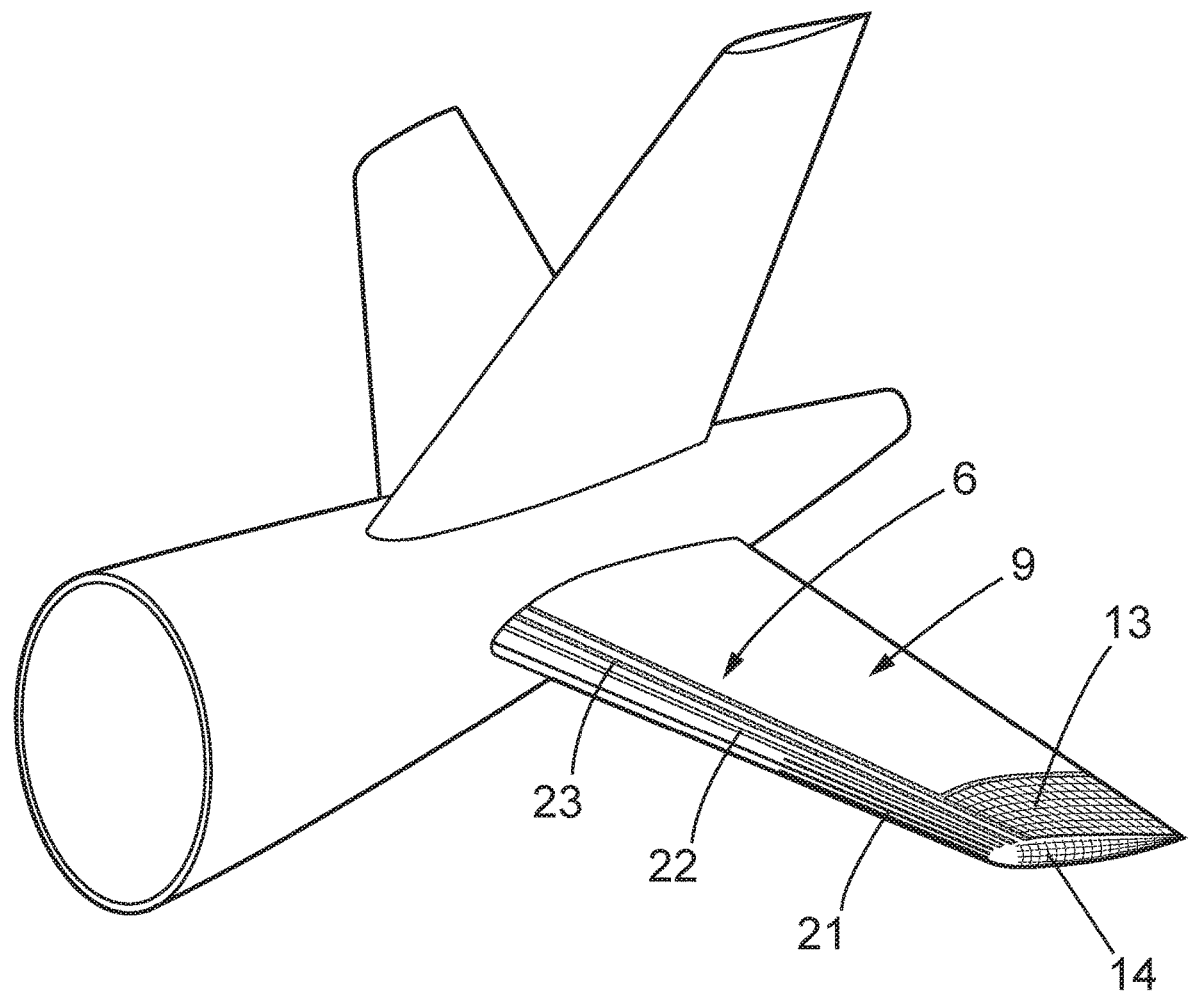
FIG. 2 is a representation of a horizontal tail plane of an aircraft.

In FIG. 2, an aircraft tail surface is represented. Elements of an aerodynamics improvement device according to the invention are represented on one of the horizontal tail plane 9.

The horizontal tail plane 9 comprises: a first group 21 of electrodes placed beneath, e.g., embedded in, the aerodynamic surface 6 at a leading edge of the horizontal tail plane 9; a second group 22 of electrodes placed beneath, e.g., embedded in, the aerodynamic surface 6 behind, e.g., aft in a chordwise direction, the leading edge and on a forward portion of the extrados of the horizontal tail plane 9; and a third group 23 of electrodes placed beneath, e.g., embedded in, the aerodynamic surface behind, e.g., aft in the chordwise direction, the second group 22 of electrodes such as on a forward portion of the extrados of the horizontal tail plane 9.

Similar to the embodiment of FIG. 1, the electrodes of the first group 21, second group 22 and third group 23 may be embedded in an anti-erosion layer such as a polyurethane layer for example.

Figure 3:
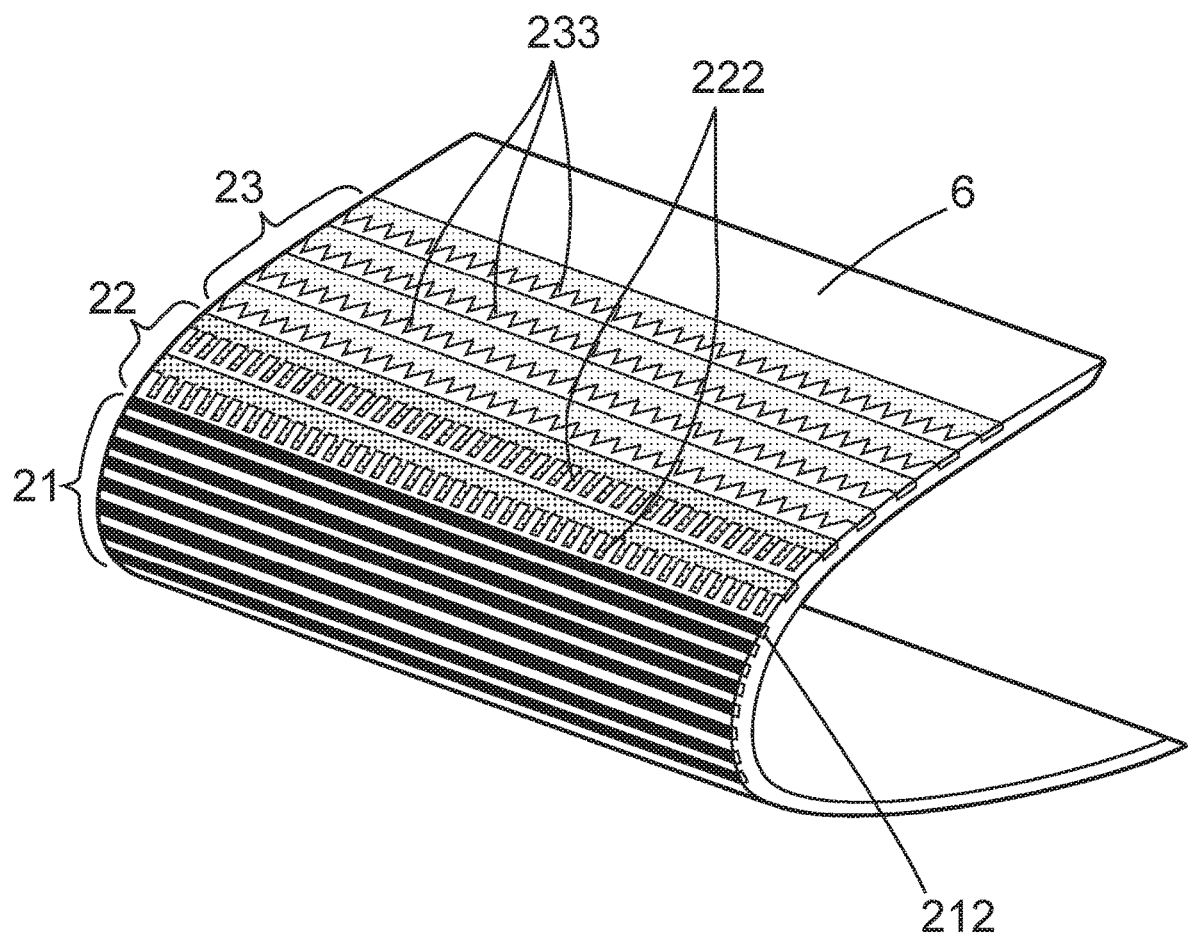
FIG. 3 is a perspective representation of a section of a horizontal tail plane of an aircraft.

The three groups 21, 22, 23 are also represented with more details on the FIG. 3.

The first group 21 of electrodes is placed on a leading edge of the horizontal tail plane 9. The main function of the first group 21 of electrodes is to generate plasma discharges at the leading edge to limit the accretion of ice, and de-ice the aerodynamic surface 6 of the horizontal tail plane 9 at the leading edge. The limitation of ice accretion and de-icing occurs by the local heating and supersonic shocks provoked by the plasma discharges along the electrodes of the first group 21.

The electrodes of the first group 21 are elongated. They are arranged in a spanwise direction of the leading edge. Some electrodes may extend along most of the length of the leading edge while some other may have a shorter length and be concentrated towards the tip of the horizontal tail plane 9, as represented on FIG. 2.

The electrodes of the first group 21 are linear and have a regular constant cross-section, such that they do not exhibit tips. The plasma discharges thus happen all along the electrodes.

The first group 21 of electrodes comprises a plurality of electrodes. In particular it comprises more than two electrodes. The electrodes may be alternatively powered by a voltage generator with a first voltage and a second voltage so as to always keep a voltage gap of at least of an ionizing voltage between two successive electrodes along the aerodynamic surface.

At least one of the electrodes of the first group 21 may be electrically connected to the ground plane of the aircraft. Only the other electrode must be supplied with a ionizing voltage.

Alternatively, each electrode may be at a different voltage, each voltage being chosen so that the voltage gap between two successive electrodes is at least of an ionizing voltage. For example a first electrode closest to the leading edge may be at a first voltage. A second electrode, adjacent to the first electrode, is at a second voltage which is at a level equal to the sum of at least a minimum ionizing voltage and the first voltage, such that the voltage applied across (between) the first and second electrode is at least the minimum ionizing voltage. A third electrode adjacent the second electrode at a third voltage which is at a voltage level of at least a sum of the minimum ionizing voltage and the second voltage.

The electrodes may be supplied with a varying voltage, such as for example a periodic voltage signal. The voltages supplied to a first electrode and to a second electrode may have a phase difference between them.

The first group 21 of electrodes may additionally be connected to a permittivity detector 20 for detecting the presence of ice on the aerodynamic surface leading edge. A controller may alternate the powering of the first group 21 of electrodes by the permittivity detector and by the voltage generator.

The second group 22 of electrodes is placed on a forward portion of an extrados of the horizontal tail plane 9. The main function of the second group 21 of electrodes is to generate plasma discharges above the aerodynamic surface 6 at the leading edge of the horizontal tail plane 9. These plasma discharges can create local perturbations in a flow of air around the horizontal tail plane 9, such that the stall angle of the horizontal tail plane 9 may be increased. Higher angles of attack are therefore rendered safe with a device according to the invention.

In the presented embodiment, the second group 22 of electrodes comprises two electrodes. They are arranged in a spanwise direction of the leading edge. These electrodes may extend along most of the length of the leading edge.

The electrodes of the second group 22 each comprise tips 222. The tips 222 are arranged laterally along the length of the electrodes. The tips 222 are oriented along the same direction and all towards the leading edge. The electrodes of the second group 22 have a comb shape with linear tips.

The tips 222 create precise locations at which the two electrodes of the second group 22 are closer to each other, such that the plasma generation is localized at very precise locations on the aerodynamic surface 6. This allows the emission of a pattern of plasma streams. The distance between the tips 222 may be chosen according to predetermined conditions. For example the distance may be chosen to optimally delay the boundary layer transition along the horizontal tail plane 9 at a given speed and angle of attack. The distance and patterns of the tips may be have a spatial frequency tuned to a frequency of cross flow unstable waves in the air flow over the aerodynamic surface 6 at cruise speed of the aircraft.

The distance between tips can vary along the span of the leading edge such that the density of plasma discharges obtained may also vary along the span. An aerodynamics improvement device according to the invention can thus be adapted to an air flow differing along the fuselage and at a tip of a wing or a tail plane.

Moreover the aft electrode 212 situated at the aft of the first group 21 and the forward electrode of the second group 22 may be supplied by the voltage generator such that the voltage gap between them is of at least the ionizing voltage. A second line of local plasma streams may thus be obtained above the gaps between the aft electrode 212 of the first group and the tips 222 of the forward electrode of the second group 22.

The third group 23 of electrodes is placed on a forward portion of an extrados of the horizontal tail plane 9, aft to the second group 22 of electrodes. The main function of the third group 23 of electrodes is to generate plasma discharges above the aerodynamic surface 6 at the front of the extrados of the horizontal tail plane 9. These plasma discharges can create local perturbations in a flow of air around the horizontal tail plane 9, such that the separation of a boundary layer is spatially delayed along the horizontal tail plane 9, towards the trailing edge of the horizontal tail plane 9, such that the drag of the horizontal tail plane 9 is reduced, even at low angles of attack. These plasma discharges may inject momentum in the airflow by creating small local vortices or perturbations in the air flow over the extrados of the horizontal tail plane 9.

In the represented embodiment, the third group 23 comprises four electrodes. The ionizing voltage between two successive electrodes can be obtained by different ways such as explained in connection to the first group of electrodes.

The electrodes of the third group 23 each comprise tips 233. The tips 233 are arranged laterally along the length of the electrodes. The tips 233 are oriented along the same direction and all towards the leading edge. The tips 233 of the electrodes of the third group 23 have a triangular shape.

Other characteristics of the tips 222 of the electrodes of the second group 22 may also apply to the tips 233 of the electrodes of the third group 23.

Moreover the aft electrode of the second group 22 may be supplied by the voltage generator such its voltage gap with the forward electrode of the third group 23 is of at least an ionizing voltage.

At least one electrode of the third group 23 is electrically connected to a lightning strike protective device comprising a metallic mesh 13 integrated at a tip 14 of the horizontal tail plane 9. The tip 14 itself may comprise one or more metallic parts connected to the mesh 13 and/or to an electrode of the third group 23. Said electrode of the third group 23 is also electrically connected at its other end to an electrical ground plane of the aircraft so as to conduct electrical charges from the wing tip to the electrical ground plane of the aircraft in particular in case of lightning strike. At least one of the electrodes of the third group 23 thus forms a bonding strip connecting lightning strike protection metallic meshes 13 and metallic components of the tip 14 to the ground plane of the aircraft.

Figure 4:
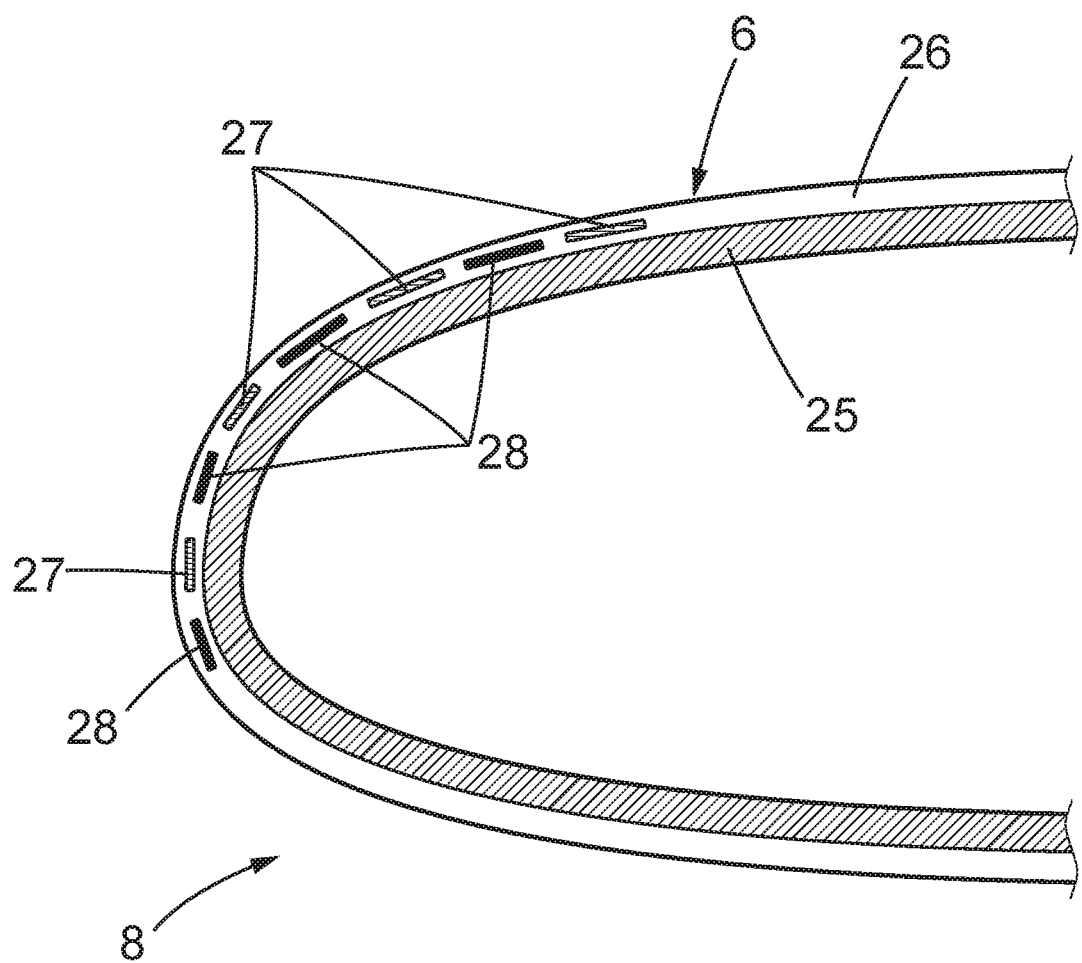
FIG. 4 is a cross-section representation of leading edge of a wing of an aircraft.

In FIG. 4 another embodiment of the present invention installed on a wing is represented in cross-section. Similarly to that of FIG. 1, it comprises a structural layer 25 and an anti-erosion layer 26 in which electrodes 27, 28 are embedded and isolated from the aerodynamic surface 6.

In this embodiment a plurality of said first electrode 27 and second electrode 28 are alternated from the leading edge to the forward portion of either surface of the wing.

Figure 5:
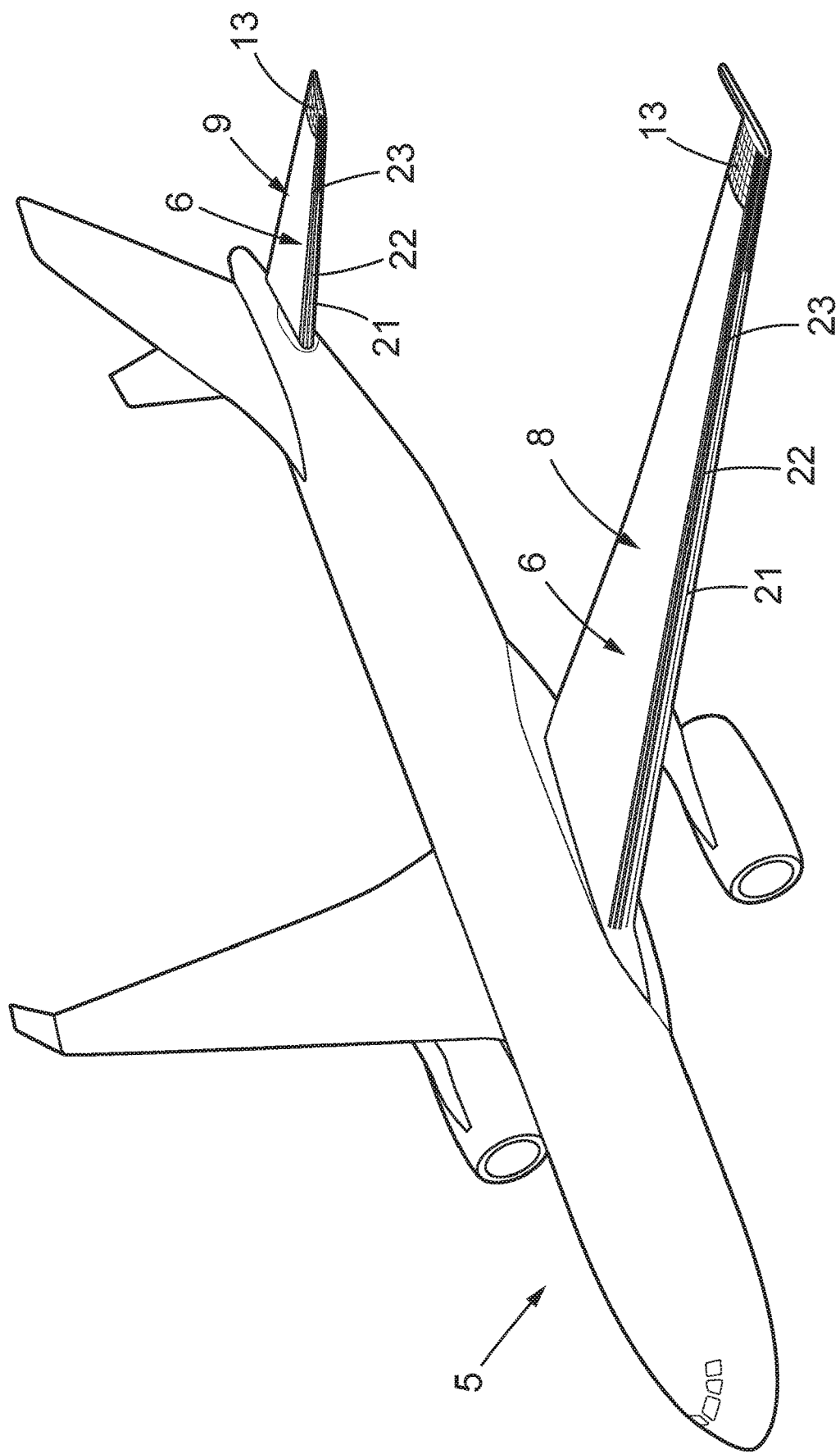
FIG. 5 is a perspective representation of an aircraft.

In FIG. 5, an aircraft is represented which comprises an aerodynamics improvement device comprising electrodes: on a horizontal tail plane, as described in relation to FIG. 2, and on a wing.

The aircraft may beneficially comprise electrodes on the opposite wing and horizontal tail plane, as well as on the vertical tail plane or engine nacelles, which are not represented on FIG. 5.

The invention is not limited to the specific embodiments herein disclosed as examples. In particular any example given in relation to a wing or a horizontal tail plane may be applied to any other lift or control surface, and more generally to any aerodynamic surface, of an aircraft. The invention also encompasses other embodiments not herein explicitly described, which may comprise various combinations of the features herein described.

While at least one exemplary embodiment of the present invention(s) is disclosed herein, it should be understood that modifications, substitutions and alternatives may be apparent to one of ordinary skill in the art and can be made without departing from the scope of this disclosure. This disclosure is intended to cover any adaptations or variations of the exemplary embodiment(s). In addition, in this disclosure, the terms "comprise" or "comprising" do not exclude other elements or steps, the terms "a" or "one" do not exclude a plural number, and the term "or" means either or both. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention is:

1. An aircraft including:
   an aerodynamic surface including an outer exposed surface adapted to be exposed to atmospheric air flowing over the aircraft;
   a first group of electrodes embedded in the aerodynamic surface and separated by an insulating layer from the outer exposed surface of the aerodynamic surface, wherein the first group of electrodes includes at least one first electrode and at least one second electrode electrically isolated from the at least one first electrode;
   a second group of electrodes separate from the first group and embedded in the aerodynamic surface and separated by the insulating layer from the outer exposed surface of the aerodynamic surface, wherein the second group of electrodes includes at least one third electrode and at least one fourth electrode electrically isolated from the at least one third electrode; and
   a voltage generator electrically connected to the first group to apply a de-icing voltage across the first and second electrodes, and connected to the second group to apply an ionizing voltage across the third and fourth electrodes;
   wherein the application of the de-icing voltage across the first and second electrodes de-ices the aerodynamic surface proximate to the first and second electrodes, and
   wherein the application of the ionizing voltage across the third and fourth electrodes ionizes air above the aerodynamic surface proximate to the third and fourth electrodes.

2. The aircraft according to claim 1, wherein the voltage generator is configured to apply the ionizing voltage as an anti-stall voltage across the third and fourth electrodes, wherein the ionizing voltage is different than the de-icing voltage.

3. The aircraft according to claim 1, wherein the first group of electrodes is embedded in a leading edge of a wing, a horizontal tail plane or a vertical tail plane.

4. The aircraft according to claim 1, wherein the second group of electrodes is embedded in a fore portion of an upper surface of a wing, horizontal tail plane or a vertical tail plane, and the second group is aft along a chordwise direction of a leading edge of the aerodynamic surface.

5. The aircraft according to claim 1, further comprising a third group of electrodes separate from and aft, along a chordwise direction of the aerodynamic surface, of both the first group and second group, and the third group is embedded in the aerodynamic surface, is separated by the insulating layer from the outer exposed surface of the aerodynamic surface, and the third group includes at least one fifth electrode and at least one sixth electrode electrically isolated from the at least one fifth electrode,
   wherein the voltage generator is electrically connected to the third group to apply a second ionizing voltage across the fifth and sixth electrodes.

6. The aircraft according to claim 5, wherein the application of the second ionizing voltage across the fifth and sixth electrodes ionizes air above the aerodynamic surface to create flow perturbations in a flow of air over the aerodynamic surface proximate to the third group of electrodes to delay separation of a boundary layer of the flow of air along the aerodynamic surface.

7. The aircraft according to claim 1, wherein, at low angles of attack of the aircraft, the voltage generator is configured to apply an anti-stall voltage, different from the ionizing voltage, across the third and fourth electrodes.

8. The aircraft according to claim 7, wherein the voltage generator is configured to apply the anti-stall voltage across the first and second electrode while the aircraft is flying at a high angle of attack.

9. The aircraft according to claim 1, further comprising an ice detection device configured to:
 measure a permittivity current between said first electrode and said second electrode while a permittivity voltage is applied across the first electrode and the second electrode, and
 based on the measured permittivity current, compute a permittivity value representative of an electrical permittivity between said first electrode and said second electrode.

10. The aircraft according to claim 9, further comprising a controller configured to control the voltage generator to alternatively apply between the first and second electrodes a permittivity voltage and an ionizing voltage.

11. The aircraft according to claim 1, further comprising a metallic mesh applied to the aerodynamic surface;
 wherein at least one electrode from the first group of electrodes or the second group of electrodes is included in the metallic mesh.

12. The aircraft according to claim 1, wherein the at least one first electrode has a comb shape.

13. The aircraft according to claim 12, wherein the at least one first electrode includes a series of first tips and the at least one second electrode includes a series of second tips, wherein the first and second tips are oriented in a forward facing chordwise direction.

14. The aircraft according to claim 1, wherein the at least one second electrode has a comb shape.

15. A method for detecting the ice on an aerodynamic surface of an aircraft comprising:
 applying a permittivity voltage across two electrodes electrically isolated from each other and embedded in the aerodynamic surface,
 measuring a current flowing between the two electrodes in response to the permittivity voltage applied to the two electrodes,
 detecting a change in electrical permittivity between the two electrodes based on the detecting a change in the measured current flow, and
 generating a signal indicating presence of ice in response to the change in electrical permittivity meeting a certain criterion.

16. The method according to claim 15, in which the permittivity voltage is applied intermittently between the two electrodes and further comprising, between successive applications of the permittivity voltage to the two electrodes, applying an ionizing voltage to ionize air above the aerodynamic surface proximate to the two electrodes.

17. A method comprising:
 applying a de-icing voltage between first and second electrodes embedded in an aerodynamic surface, wherein the first electrode is electrically isolated from the second electrode and the application of the de-icing voltage de-ices the aerodynamic surface, and
 applying an ionizing voltage between third and fourth electrodes embedded in the aerodynamic surface aft of the first and second electrodes in a chordwise direction of the aerodynamic surface,
 ionizing air flowing over the aerodynamic surface proximate to the third and fourth electrodes by the application of the ionizing voltage between the third and forth electrodes,
 wherein the third electrode is electrically isolated from the fourth electrode and the ionizing voltage differs from the de-icing voltage.

18. The method according to claim 17, further comprising, at low angles of attack of the aircraft, applying:
 the de-icing voltage across the first and second electrodes, and
 an anti-stall voltage, different from the de-icing voltage, across the third and fourth electrodes.

19. The method according to claim 18, further comprising, at high angles of attack of the aircraft, applying an anti-stall voltage across the first and second electrodes.

20. The method according to claim 17, wherein the application of the ionizing voltage includes applying the ionizing voltage at an ionizing frequency.

* * * * *